(12) United States Patent
Doui

(10) Patent No.: US 9,088,566 B2
(45) Date of Patent: Jul. 21, 2015

(54) INFORMATION PROCESSING SYSTEM, INFORMATION PROCESSING DEVICE, AND RELAY SERVER

(75) Inventor: Takayuki Doui, Takatsuki (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 27 days.

(21) Appl. No.: 13/474,756

(22) Filed: May 18, 2012

(65) Prior Publication Data

US 2012/0293819 A1 Nov. 22, 2012

(30) Foreign Application Priority Data

May 19, 2011 (JP) .................................. 2011-112255

(51) Int. Cl.
*H04L 29/06* (2006.01)
*G06F 3/12* (2006.01)

(52) U.S. Cl.
CPC ............ *H04L 63/083* (2013.01); *G06F 3/1222* (2013.01); *G06F 3/1238* (2013.01); *G06F 3/1285* (2013.01)

(58) Field of Classification Search
USPC .................... 358/1.13, 1.15, 468, 401, 405
See application file for complete search history.

(56) References Cited

U.S. PATENT DOCUMENTS

| | | | | |
|---|---|---|---|---|
| 7,313,699 | B2 * | 12/2007 | Koga ............................ | 713/170 |
| 2008/0005781 | A1 * | 1/2008 | Koga ............................. | 726/2 |
| 2008/0034098 | A1 | 2/2008 | Shima | |
| 2008/0222446 | A1 * | 9/2008 | Yasaki et al. ..................... | 714/1 |
| 2010/0293602 | A1 * | 11/2010 | Uchida ............................ | 726/4 |
| 2011/0107396 | A1 * | 5/2011 | Ozaki ............................. | 726/2 |

FOREIGN PATENT DOCUMENTS

| | | |
|---|---|---|
| JP | 2003-169049 A | 6/2003 |
| JP | 2008-137160 A | 6/2008 |
| JP | 2008-140067 A | 6/2008 |
| JP | 2008-141432 A | 6/2008 |
| JP | 2009-301344 A | 12/2009 |
| JP | 02011018171 * 1/2011 | ................ G06F 3/12 |

OTHER PUBLICATIONS

Office Action (Decision to Grant a Patent) dated Jun. 18, 2013, issued by the Japanese Patent Office in the corresponding Japanese Patent Application No. 2011-112255 and an English translation thereof. (6 pages).

* cited by examiner

*Primary Examiner* — Jerome Grant, II
(74) *Attorney, Agent, or Firm* — Buchanan Ingersoll & Rooney PC

(57) ABSTRACT

An information processing system includes an information processing device, an image forming device, an authentication server performing authentication of a user and a relay server receiving an authentication request from the image forming device and establishing data communication with the authentication server. The information processing device attaches authentication information set in advance in a printer driver to the print job and sends to the image forming device, while sending user information indicating that the user is successfully authenticated in the authentication server to the relay server. The relay server identifies the user information received from the information processing device based on the authentication information included in the received authentication request and establishes data communication with the authentication server based on the identified user information, thereby verifying if the user is a registered user and sending the response to the authentication request to the image forming device.

18 Claims, 9 Drawing Sheets

INFORMATION PROCESSING SYSTEM, INFORMATION PROCESSING DEVICE, AND RELAY SERVER

This application is based on the application No. 2011-112255 filed in Japan, the contents of which are hereby incorporated by reference.

BACKGROUND OF THE INVENTION

1. Field of the Invention

The present invention relates to an information processing system, an information processing device, and a relay server.

2. Description of the Background Art

Image processing systems including authentication servers that authenticate users who use a device connected through a network in a networking environment and allowing the users to use the device are known as conventional image processing systems. The authentication server connected to the network is for example an Active Directory. In such a case, an information processing device receives input of authentication information including a user name and a password and sends the authentication information input from the user to the authentication server, thereby authenticating the user who uses the information processing device such as a computer connected to the network. When the user is determined to be a registered user who is registered in the authentication server as a result of the authentication in the authentication server, the information processing device is put into a logged-in state to allow the user to use. For this kind of information processing systems, each user's password registered in advance in the authentication server is normally changed every certain period of time such as 90 days in view of security.

Recently, a user name and a password are set in advance in a printer driver in the information processing device. When starting the printer driver to send a print job to an image forming device such as a printer, the information processing device reads the user name and password set in advance in the printer driver to send them with the print job. In this case, the image forming device sends the user name and password attached to the print job to a relay server and acquires a result of the authentication in the authentication server via the relay server. If the result of the authentication in the authentication server shows that the user is the registered user, the image forming device executes the print job received from the information processing device. If the result of the authentication in the authentication server does not show that the user is the registered user, the image forming device is configured not to execute the print job received from the information processing device.

On the information processing system as described above, the password set in the printer driver is not automatically updated in response to changing of the user's password registered in advance in the authentication server. So, the user, for instance, may input the changed password correctly to log into the information processing device to use the information processing device. If the user gives a print instruction while logging into the information processing device, the information processing device may send a print job with the previous password before changing to the image processing device. In such a case, the image forming device acquires information not showing that the user is the registered user as a result of the authentication in the authentication server. The print job received from the information processing device is not executed then. Even though the user who gave the print instruction is the registered user authenticated in the authentication server, the print job is not executed. So, although the user goes to where the image processing device is placed after giving the print instruction, he or she cannot have a printing output.

In order to solve this involved problem, for example, when starting the printer driver to send the print job to the image forming device, the conventional information processing device sends the print job with information to skip the authentication if the information processing device has already been authenticated in the authentication server. This known technique is introduced for example in Japanese Patent Application Laid-Open No. 2009-301344. According to this technique, when the information processing device is authenticated in the authentication server normally, authentication at receipt of the print job by the image forming device can be skipped. So, the above-described inconvenience may be prevented.

According to the conventional technique, however, the information processing device sends new information to skip the authentication with the print job to the image forming device. In this case, the print job is not allowed to be sent with a general protocol for transmission and receipt of a print job as a communication protocol between the printer driver and the image forming device. This brings a problem that interfaces for establishing communications with an enhanced communication protocol needs to be implemented in each of the printer driver in the information processing device and the image forming device.

In many of the above-described networking environments, more than one information processing devices are connected. Not every printer driver installed in advance in each of the information processing devices includes a function to attach the information to skip the authentication. The image forming device installed in the networking environment needs to be configured to receive appropriately both a print job sent with the general communication protocol for general job transmission and a print job sent with the enhanced communication protocol for skipping the authentication. In addition, the image forming device needs to switch a process for each of the received print job depending on the communication protocol for receipt of the print job. This involves a problem that an internal structure of the image forming device becomes complicated.

According to the above-described technique, the user sent the print job may not be verified whether or not he or she is the registered user at time of receipt of the print job by the image forming device. This may cause security compromise.

SUMMARY OF THE INVENTION

The present invention has been made in order to solve the above-described problems. The present invention is intended to provide an information processing system, an information processing device, and a relay server with which a general protocol for transmission and receipt of a print job is allowed to be used between a printer driver in the information processing device and an image forming device. Moreover, the print job is executed after verifying whether or not a user who sent the print job is one of registered users when the image forming device receives the print job.

First, the present invention is directed to an information processing system.

According to one aspect of the information processing system, the information processing system includes: an information processing device generating a print job by executing a printer driver; an image forming device producing a printed output in response to the print job received from the information processing device; an authentication server performing authentication of a user who uses the information processing device and the image forming device; and a relay server receiving an authentication request from the image forming device and establishing data communication with the authentication server, thereby sending a response to the authentication request to the image forming device. The information processing device, in sending the print job to the image forming device by executing the printer driver after the user authentication results in success through data communication with the authentication server, attaches authentication information set in advance in the printer driver to the print job and sends to the image forming device, while sending user information indicating that the user is successfully authenticated in the authentication server to the relay server. The relay server, in response to receipt of the authentication request sent from the image forming device which receives the print job, identifies the user information received from the information processing device based on the authentication information included in the received authentication request and establishes data communication with the authentication server based on the identified user information, thereby verifying if the user is a registered user and sending the response to the authentication request to the image forming device in accordance with the verification result.

Second, the present invention is directed to an information processing device.

According to one aspect of the information processing device, the information processing device comprises: a log-in controlling part for putting into a logged-in state based on an authentication result of a user performed in an authentication server; a job generation part for generating a print job by executing a printer driver after being put into the logged-in state by the log-in controlling part; a job transmission part for reading authentication information set in advance in the printer driver to attach to the print job and sending the print job with the authentication information to an image forming device; and a user information transmission part for sending user information indicating that the user is successfully authenticated through authentication in the authentication server to a relay server that is a destination of an authentication request based on the authentication information and sent by the image forming device.

Third, the present invention is directed to a relay server receiving an authentication request from an image forming device that executes a print job and establishing data communication with an authentication server in response to the authentication request, thereby sending a response to the authentication request to the image forming device.

According to one aspect of the relay server, the relay server comprises: a user information acquisition part for receiving user information indicating that a user is successfully authenticated in the authentication server from an information processing device that sends the print job to the image forming device; a user information identification part for identifying the user information received from the information processing device after receiving the authentication request from the image forming device, the user information being identified with authentication information contained in the received authentication request; and a response processing part for verifying whether or not the user is a registered user through data communication with the authentication server established on a basis of the user information identified by the user information identification part and sending the response to the authentication request to the image forming device in accordance with the verification result.

DESCRIPTION OF THE PREFERRED EMBODIMENTS

Figure 1:
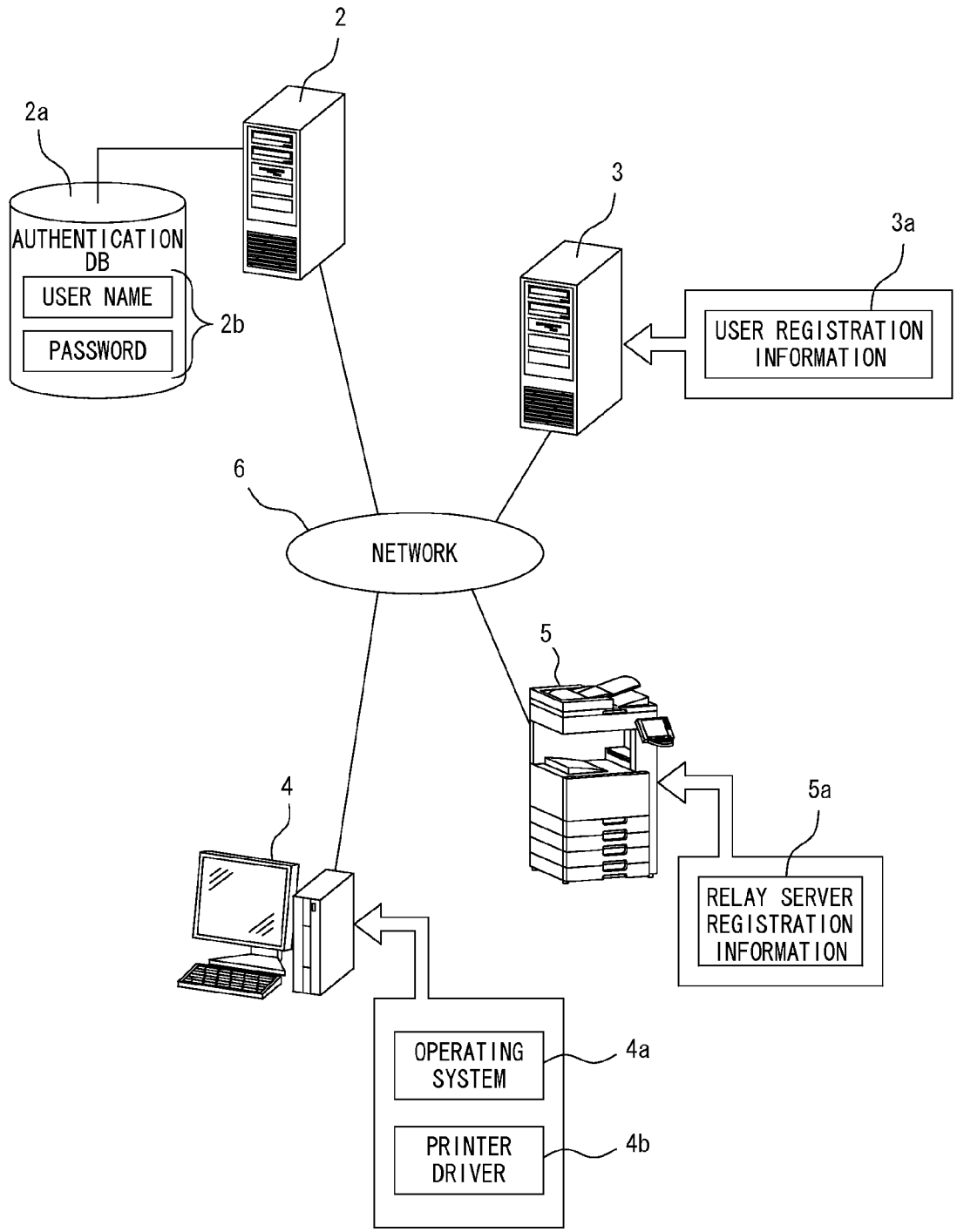
FIG. 1 shows an exemplary configuration of an information processing system.

A preferred embodiment of the present invention is described in detail below with reference to figures. In the description given below, those elements which are shared in common in the preferred embodiment are represented by the same reference numerals, and are not discussed repeatedly for the same description.

FIG. 1 shows an exemplary configuration of an information processing system 1 of the present preferred embodiment. The information processing system 1 includes an authentication server 2, a relay server 3, an information processing device 4 and an image forming device 5 connected together via a network 6, in a manner that allows data communication with each other. On the information processing system 1, the authentication server 2 is configured to perform integrated authentication process of users who use the devices connected to the network 6. After the user is identified as one of registered users as a result of authentication in the authentication server 2, the user is allowed to use the device. The authentication server 2, the relay server 3, the information processing device 4 and the image forming device 5 are connected via the network 6 in an example of FIG. 1. The number of each connected device may be more than one. The network 6 is a communication network configured to include networks such as a local area network (LAN) or a wide area network (WAN) like an internet.

The authentication server 2 includes an authentication function to authenticate users who use the devices connected via the network 6, more specifically the information processing device 4 and the image forming device 5. The authentication server 2 includes an authentication database 2a. Authentication information 2b including a combination of a user name and a password of a user who uses the information processing device 4 and the image processing device 5 is registered in advance for each user. As receiving an authentication request containing a user name and a password via the network 6, the authentication server 2 determines whether or not a combination of the user name and password contained in the authentication request is registered in the authentication database 2a. If the authentication information 2b matching the user name and the password contained in the authentication request is registered in the authentication database 2a, the authentication results in success. In this case, the authentication server 2 sends an authentication result indicating that the user is one of registered users to an address that the authentication request is sent from. If the authentication information 2b matching the user name and the password contained in the authentication request is not registered in the authentication database 2a, the authentication results in failure. In this case, the authentication server 2 sends an authentication result indicating an unregistered user to an address that the authentication request is sent from.

The information processing device 4 is, for example, formed from a generally-used personal computer (PC). As shown in FIG. 1, an operating system (OS) 4a, a basic program is installed in advance on the information processing device 4. After the information processing device 4 is turned on, the operating system is automatically started. Also, various types of application programs and a printer driver 4b to send print jobs to the image forming device 5 are installed in advance on the information processing device 4. The printer driver 4b is executed in response to a print instruction to the information processing device 4 by the user.

The image forming device 5 including at least a print function is configured to receive a print job via the network 6 and execute the received print job to produce a printing output. The image forming device 5 of the present preferred embodiment is one of MFPs that includes more than one functions such as a copy function, a scanner function and a FAX function besides the print function, and is capable of executing variety of jobs including copy jobs, scan jobs and FAX jobs in addition to print jobs.

The image forming device 5 stores therein relay server registration information 5a in advance. The image forming device 5 sends an authentication request to the relay server 3 registered with the relay server registration information 5a to verify whether the user who gave a job execution instruction is one of the registered users at execution of the job. The image forming device 5 receives a response to the authentication request from the relay server 3 and switches its state to or not to execute the job based on the received response. More specifically, the image forming device 5 establishes data communication with the relay server 3 registered in advance in the relay server registration information 5a instead of establishing data communication directly with the authentication server 2, thereby verifying whether or not the user gave the job execution instruction is one of the registered users.

The relay server 3 serves to relay data communication between the image forming device 5 and the authentication server 2. As receiving the authentication request from the image forming device 5, the relay server 3 performs data communication with the authentication server 2 in response to the authentication request, and sends the response indicating whether or not the user is one of the registered users to the image forming device 5. The relay server 3 stores therein user registration information 3a in which one or more users who use the image forming device 5 are registered. The user registration information 3a includes function restriction information to restrict available functions on the image forming device 5 registered for each user who is authorized to use the image forming device 5. The function restriction information designates availabilities including that of color printings. For sending the response indicating that the user gave the job execution instruction is one of the registered users responsive to the authentication request, the relay server 3 reads the function restriction information set for the user from the user registration information 3a to designate the image forming device 5 to provide at least one function available for the user.

As described above, the relay server 3 is configured to relay the authentication request from the image forming device 5 connected via the network 6. If more than one image forming devices 5 are connected together via the network 6, the relay server 3 receives the authentication request from each of the image forming devices 5 and sends the response responsive to each authentication request. Such relay server 3 allows centrally managing and controlling variety of functions corresponding to jobs executed in each of the image forming devices 5 connected via the network 6.

Figure 2:
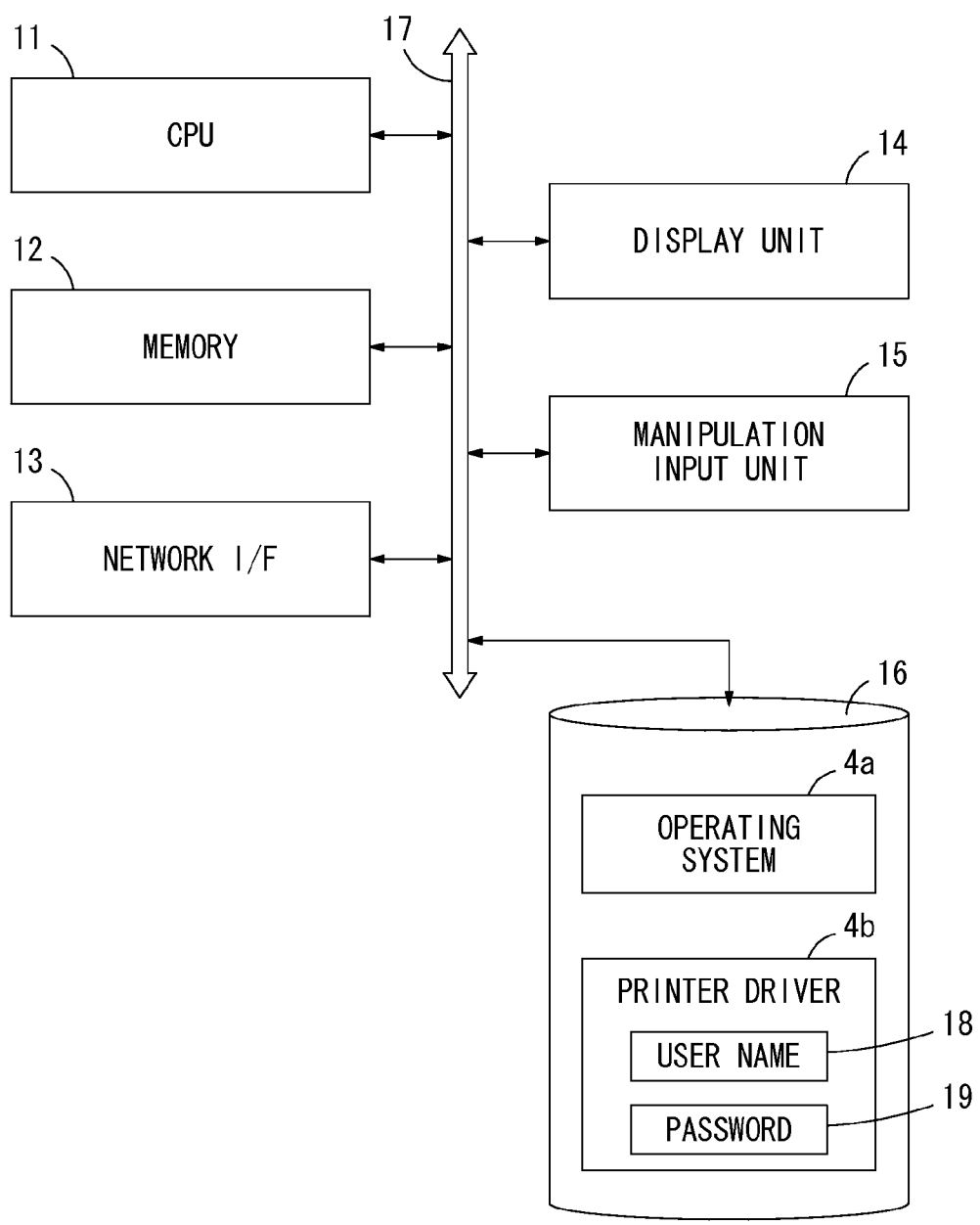
FIG. 2 is a block diagram showing the hardware configuration of an information processing device.

FIG. 2 is a block diagram showing the hardware configuration of the information processing device 4. As illustrated in FIG. 2, the information processing device 4 includes a CPU 11, a memory 12, a network interface 13, a display unit 14, a manipulation input unit 15 and a storage unit 16 that are connected together to allow data communication between these parts via a data bus 17.

The CPU 11 is a computation processing unit which reads and executes a variety of programs in the storage unit 16. The memory 12 stores therein data such as temporary data required when the CPU 11 executes the programs. The network interface 13 is for connecting the information processing device 4 to the network 6. The display unit 14 on which various types of information are displayed to users is formed from a device such as a liquid crystal display. The manipulation input unit 15 formed from parts including a keyboard and a mouse is to receive a variety of inputs from the users. The storage unit 16 is a nonvolatile storage device such as a hard disk drive. The storage unit 16 stores therein in advance the operating system 4a and the printer driver 4b. Besides, other application programs and data are also stored. A user name 18 and a password 19 are set in the printer driver 4b as shown in FIG. 2. The user name 18 and the password 19 are, for example, input by the user at installation of the printer driver 4b.

As the information processing device 4 with the above-described hardware configuration is turned on, the CPU 11 automatically reads and executes the operating system 4a. Also, when the information processing device 4 receives the print instruction by the user via the manipulation input unit 15 after starting the operating system 4a normally, the CPU 11 reads and executes the printer driver 4b.

Figure 3:
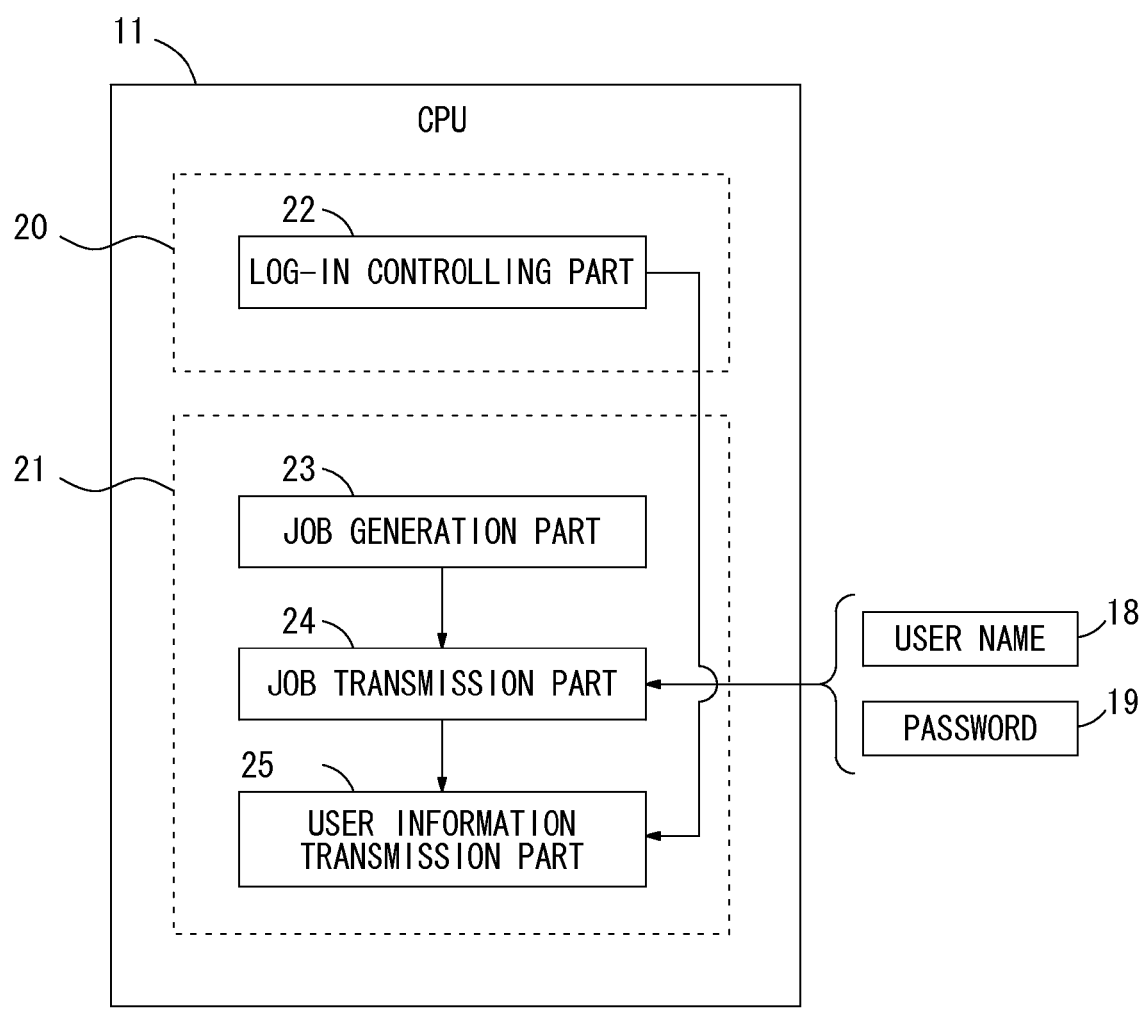
FIG. 3 is a block diagram showing an exemplary functional configuration realized by execution of an operating system and a printer driver in the information processing device.

FIG. 3 is a block diagram showing an exemplary functional configuration realized by execution of the operating system 4a and the printer driver 4b by the CPU 11. As shown in FIG. 3, the CPU 11 serves as a first function part 20 realized by execution of the operating system 4a and a second function part 21 realized by execution of the printer driver 4b.

The first function part 20 includes a log-in controlling part 22. The log-in controlling part 22 becomes operative in response to start of the operating system 4a by the CPU 11. As being operative, the log-in controlling part 22 connects to the authentication server 2 via the network interface 13 to send an authentication request with the user name and password received through the manipulation input unit 15 to the authentication server 2. The log-in controlling part 22 then receives a result of an authentication of a user that is performed in response to the authentication request from the authentication server 2. When the user is determined as one of the users registered in the authentication server 2, the log-in controlling part 22 puts the information processing device 4 into a logged-in state to make the information processing device 4 available for the logged-in user. After starting the operating system 4a normally to put it into the logged-in state, the information processing device 4 starts the printer driver 4b based on the print instruction by the logged-in user.

When the user is determined as one of the users not registered in the authentication server 2 as the result the authentication of the user in the authentication server 2, the log-in controlling part 22 does not put the information processing device 4 into the logged-in state. In this case, the user is not allowed to use the information processing device 4 normally. The user is not allowed to give the print instruction in this state either, so the printer driver 4b is not started in the information processing device 4.

The information processing device 4 receives the input of the user name and password by the user while the operating system 4a is running in response to operation to turn on. When the user is determined as one of the registered users as the result the authentication of the user in the authentication server 2, the information processing device 4 is put into the logged-in state to allow the logged-in user to give the print instruction.

After the print instruction is given by the logged-in user, the CPU 11 executes the printer driver 4b to put the second function part 21 into operation. The second function part 21 includes a job generation part 23, a job transmission part 24 and a user information transmission part 25. The job generation part 23 acquires data targeted for printing such as data of documents or images and generates a print job based on the printing target data. The job transmission part 24 sends the print job generated by the job generation part 23 to the image forming device 5. For sending the print job, the job transmission part 24 reads the user name 18 and the password 19 set in the printer driver 4b to generate authentication information containing the user name 18 and the password 19 and attaches to the print job. The job transmission part 24 then sends the print job with the authentication information to the image forming device 5 via the network interface 13. The user information transmission part 25 puts into operation as the job transmission part 24 sends the print job to the image forming device 5 and sends user information indicating that it is determined by the log-in controlling part 22 that the user is successfully authenticated in the authentication server 2. To be more specific, the user information transmission part 25 acquires the user name of the logged-in user and access information to access the authentication server 2 from the log-in controlling part 22 to generate the user information containing the acquired information and sends the user information to the relay server 3. The address of the relay server 3 to which the user information is sent is set in advance at, for example, installation of the printer driver 4b. The user information transmission part 25 is configured to send the user information to the relay server 3's address set in advance.

In response to the print instruction given by the user in the logged-in state in which the user is logging into the information processing device 4, the print job is generated in the information processing device 4 and is output to the image forming device 5 with the authentication information set in advance in the printer driver 4b. The authentication information attached to the print job is information isolated from the authentication information 2b managed in the authentication server 2. So, the authentication information attached to the print job is not updated in response to the change made to the authentication information 2b managed in the authentication server 2. The information set at the installation of the printer driver 4b is attached to the print job as it is.

When receiving the print job from the information processing device 4, the image forming device 5 of the present preferred embodiment sends the authentication request to the relay server 3 based on the authentication information attached to the print job as well as the conventional image forming devices. The image forming device 5 then determines whether or not the user specified the print job is one of the registered users based on the response received from the relay server 3 and executes the print job if the user is the registered user. When the response received from the relay server 3 indicates that the user is not the registered user, the image forming device 5 discards the print job received from the information processing device 4 without executing it.

After receiving the authentication request from the image forming device 5, the relay server 3 performs the required process in response to the authentication request and sends the response to the authentication request to the image forming device 5. According to the present preferred embodiment, the user information is transmitted to the relay server 3 in response to sending of the print job to the image forming device 5 by the information processing device 4 as described above. If the relay server 3 has already received the user information from the information processing device 4 at receipt of the authentication request from the image forming device 5, it establishes data communication with the authentication server 2 in accordance with the received user information, thereby sending the response to the image forming device 5.

Figure 4:
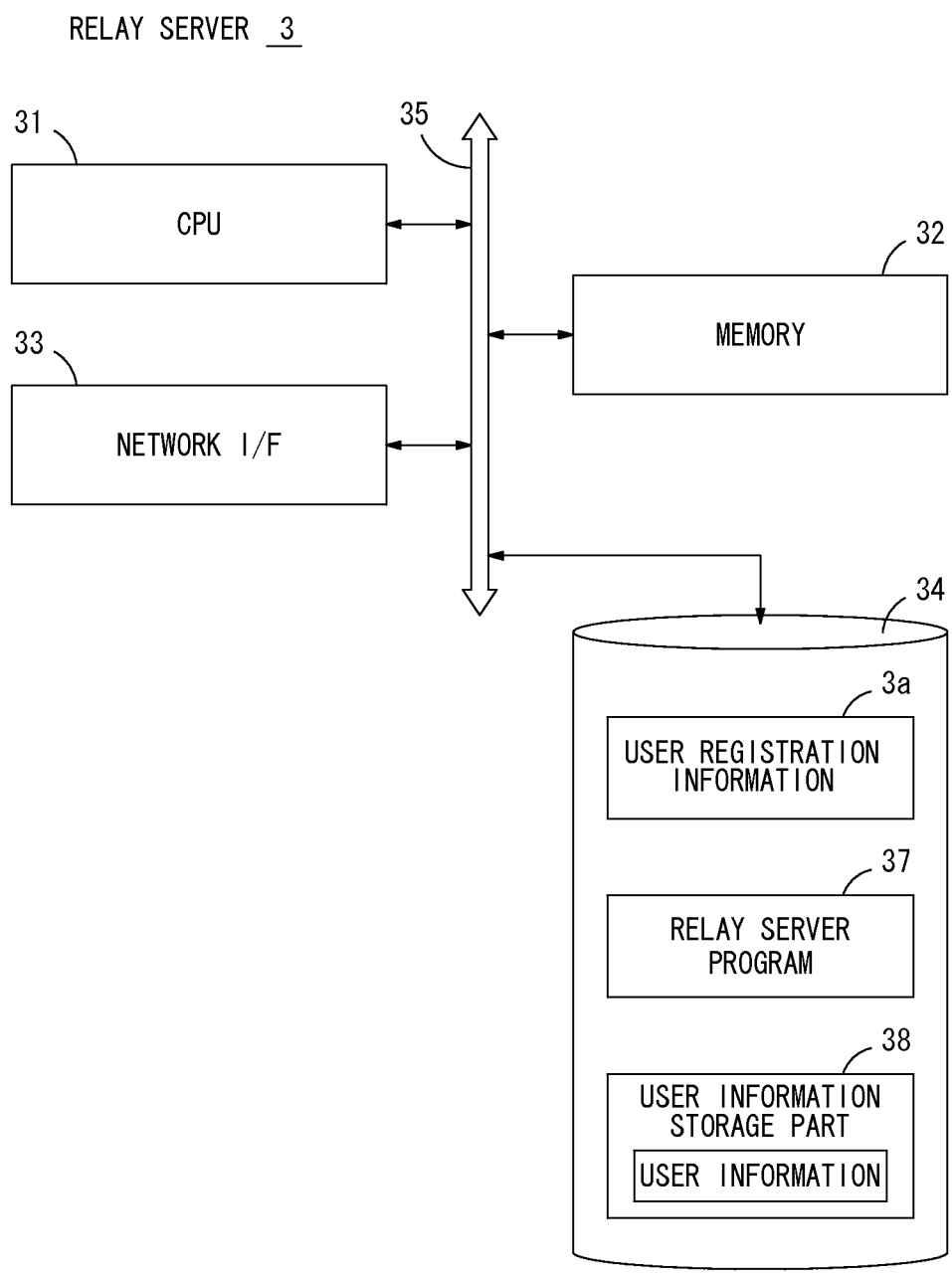
FIG. 4 is a block diagram showing the hardware configuration of a relay server.

FIG. 4 is a block diagram showing the hardware configuration of the relay server 3. As illustrated in FIG. 4, the relay server 3 includes a CPU 31, a memory 32, a network interface 33 and a storage unit 34 that are connected together to allow data communication between these parts via a data bus 35. The CPU 31, a computation processing unit, reads and executes variety of programs in the storage unit 34. The memory 32 stores therein data such as temporal data required when the CPU 31 executes the programs. The network interface 33 is responsible for connecting the relay server 3 to the network 6. The storage unit 34 is a nonvolatile storage device such as a hard disk drive. The storage unit 34 stores therein the above-described user registration information 3a and a relay server program 37 executed by the CPU 31. The storage unit 34 is provided with a user information storage part 38 to store therein the user information received from the information processing device 4.

Figure 5:
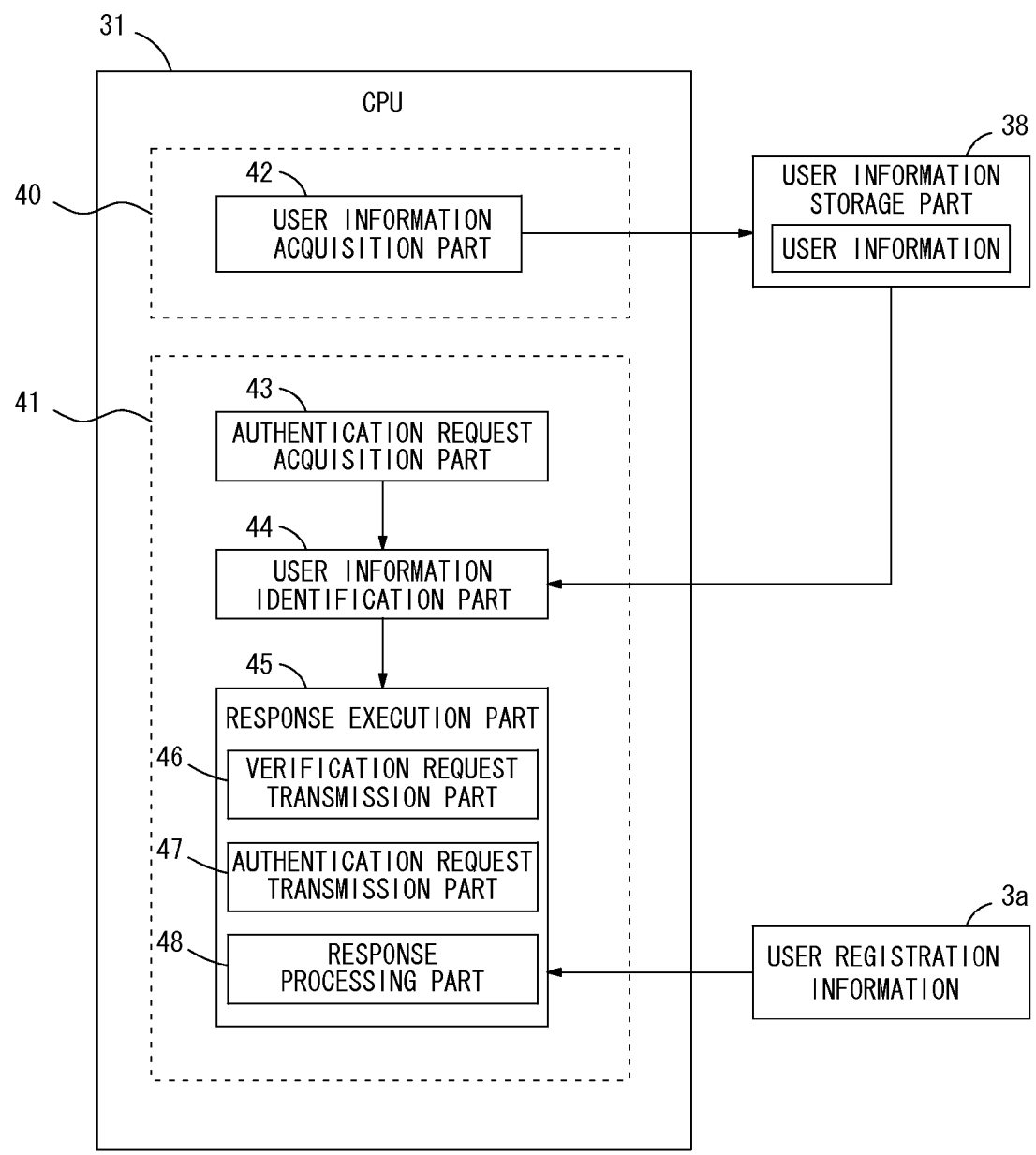
FIG. 5 is a block diagram showing an exemplary functional configuration realized in response to execution of a relay server program in the relay server.

FIG. 5 is a block diagram showing an exemplary functional configuration realized in response to execution of the relay server program 37 by the CPU 31 in the relay server 3. The CPU 31 of the relay server 3 executes the relay server program 37, thereby serving as a user information processing part 40 becomes operative in response to receipt of the user information from the information processing device 4 and an authentication request processing part 41 becomes operative in response to receipt of the authentication request from the image forming device 5.

The user information processing part 40 includes a user information acquisition part 42. The user information acquisition part 42 becomes operative when it receives the user information indicating that the user is authenticated in the authentication server 2 from the information processing device 4 which sends the print job to the image forming device 5, and stores the received user information in the user information storage part 38.

The authentication request processing part 41 includes an authentication request acquisition part 43, a user information identification part 44 and a response execution part 45. The authentication request acquisition part 43 is put into operation in response to receipt of the authentication request from the image forming device 5. The authentication request acquisition part 43 became operative outputs the received authentication request to the user information identification part 44 and puts the user information identification part 44 into operation.

The user information identification part 44 identifies the user information received from the information processing device 4 based on the authentication information contained in the authentication request from the image forming device 5 when the authentication request acquisition part 43 receives the authentication request. More specifically, as inputting the authentication request via the authentication request acquisition part 43, the user information identification part 44 searches for the user information in the user information storage part 38 based on the authentication information contained in the authentication request and identifies the user information corresponds to the authentication information. If, for example, the user information matching the user name contained in the authentication information is stored in the user information storage part 38, the user information identification part 44 identifies the user information matching the user name. The user information identification part 44 that could identify the user information corresponds to the authentication request puts the response execution part 45 into operation next.

When the user information corresponds to the authentication information is not stored in the user information storage part 38, the user information identification part 44 is not allowed to identify the user information. In such a case, the user information identification part 44 is put into a waiting state to receive the user information from the information processing device 4 for a predetermined period of time. When receiving the user information corresponds to the authentication request from the information processing device 4 in the predetermined period of time, the user information identification part 44 identifies the user information. When not receiving the user information corresponds to the authentication request from the information processing device 4 in the predetermined period of time, the user information identification part 44 puts the response execution part 45 into operation without identifying the user information.

The response execution part 45 sends a response to the authentication request from the image forming device 5. As illustrated in FIG. 5, the response execution part 45 includes a verification request transmission part 46, an authentication request transmission part 47 and a response processing part 48. In the response execution part 45, either of the verification request transmission part 46 or the authentication request transmission part 47 is configured to become operative first, and the response processing part 48 becomes operative next.

The verification request transmission part 46 becomes operative when the user information identification part 44 is allowed to identify the user information corresponds to the authentication request. The verification request transmission part 46 sends a user verification request to the authentication server 2 from the user information identified by the user information identification part 44. More specifically, the verification request transmission part 46 specifies the authentication server 2 on a basis of access information in the user information identified by the user information identification part 44 and sends the user verification request to the designated authentication server 2. The user verification request is sent to the authentication server 2 to verify whether or not the user name contained in the user information is registered in the authentication database 2a thereof. To be more specific, the verification request transmission part 46 is configured to just verify whether or not the user name contained in the user information is registered in the authentication database 2a and not to use the password contained in the authentication request from the image forming device 5 then. As receiving the user verification request, the authentication server 2 sends a user verification result indicating whether or not the identified user name is registered in the authentication database 2a as the response to the user verification request to the relay server 3 instead of executing the normal user authentication process therein. After receiving the user verification result in response to the user verification request, the verification request transmission part 46 puts the response processing part 48 into operation.

The authentication request transmission part 47 becomes operative when the user information identification part 44 is not allowed to identify the user information corresponds to the authentication request. The authentication request transmission part 47 sends the authentication request received from the image forming device 5 as it is to the relay server 3. In such a case, the normal user authentication process is performed with the user name and the password contained in the authentication request in the authentication server 2 and the authentication result is sent as the response to the relay server 3 from the authentication server 2. After receiving the authentication result in response to the authentication request from the authentication server 2, the authentication request transmission part 47 puts the response processing part 48 into operation.

The response processing part 48 sends the response to the authentication request to the image forming device 5. When the user verification result acquired by the verification request transmission part 46 indicates that the user is the one registered in the authentication database 2a, the response processing part 48 sends the response indicating that the user is the registered user to the image forming device 5 and notifies the available functions for the registered user to the image forming device 5 by reading the user registration information 3a. When the user verification result acquired by the verification request transmission part 46 indicates that the user is the one not registered in the authentication database 2a, the response processing part 48 sends the response indicating that the user is the unregistered user to the image forming device 5.

The authentication result acquired by the authentication request transmission part 47 indicates that the authentication results in success and the user specified by the authentication request is one of the registered users. In such a state, the response processing part 48 sends the response indicating that the user is the registered user to the image forming device 5 and notifies the available functions for the registered user to the image forming device 5 by reading the user registration information 3a. On the other hand, the authentication result acquired by the authentication request transmission part 47 indicates that the authentication results in failure and the user specified by the authentication request is one of the unregistered users. In such a state, the response processing part 48 sends the response indicating that the user is the unregistered user to the image forming device 5.

The image forming device 5 determines whether or not the user gave an instruction on the print job is one of the registered users based on the response received from the relay server 3. For the registered user, the image forming device 5 executes the print job. When the user gave the instruction on the print job is one of the unregistered users, the image forming device 5 discards the print job without executing it.

Figure 6:
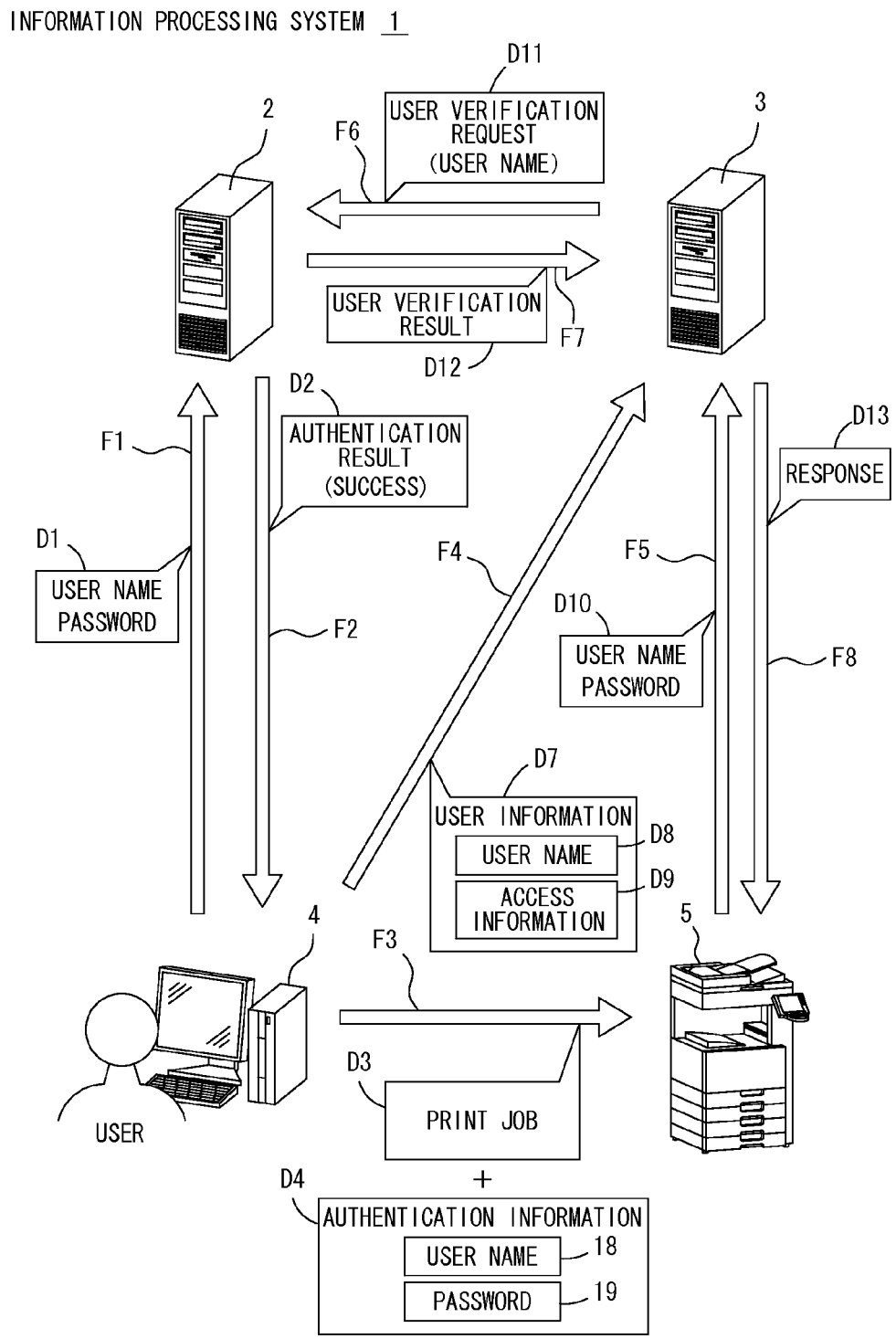
FIG. 6 is a view showing a frame format of data communication in the information processing system.

A brief overview of data communication established in the information processing system 1 having the above-described structure is explained next. FIG. 6 is a view showing a frame format of the data communication in the information processing system 1. After the information processing device 4 is turned on by the user, the operating system 4a therein is started and a screen asking the user for the user name and the password appears. After the user name and the password are input by the user, an authentication request D1 containing the user name and the password is sent by the operating system 4a to the authentication server 2 (arrow F1). As receiving the authentication request D1, the authentication server 2 performs the authentication of the user and sends an authentication result D2 to the information processing device 4 (arrow F2). When receiving the authentication result D2 indicating that the authentication results in success, the information processing device 4 puts itself into a logged-in state to allow the user to use.

In response to the print instruction given by the user on the information processing device 4, the information processing device 4 starts the printer driver 4b. The information processing device 4 generates a print job D3 based on print target data specified by the user and sends it to the image forming device 5 (arrow F3). The information processing device 4 reads the user name 18 and the password 19 set in advance in the printer driver 4b and generates authentication information D4 containing the read user name 18 and password 19. The information processing device 4 then sends the generated authentication information D4 with the print job D3 to the image forming device 5. When sending the print job D3 to the image forming device 5, the information processing device 4 attaches the authentication information D4 to the print job D3. In the present preferred embodiment, the information processing device 4 sends the print job D3 with the authentication information D4 to the image forming device 5 by using the general protocol for transmission and receipt of print jobs as a communications protocol between the printer driver 4b and the image forming device 5.

The information processing device 4 generates user information D7 containing a user name D8 of the logged-in user and access information D9 to access the authentication server 2 with sending the print job D3 to the image forming device 5. The information processing device 4 sends the generated user information D7 to the relay server 3 (arrow F4). The access information D9 in the user information D7 is a domain name of the authentication server 2, for instance.

According to the present preferred embodiment, in order to ensure the security, the access information D9 is encrypted with the password 19 as an encryption key set in the printer driver 4b to send the user information D7 to the relay server 3 by the user information transmission part 25. Both of the user name 18 and the password 19 are not set for every user in the printer driver 4b. For the user for that the password 19 is not set in the printer driver 4b, the user information transmission part 25 generates random one-time password and sends the authentication information D4 containing the generated one-time password to the image forming device 5. At the same time, the user information D7 containing the access information D9 encrypted with the one-time password is sent to the relay server 3.

After receiving the print job D3 with the authentication information D4 from the information processing device 4, the image forming device 5 generates an authentication request D10 with the user name 18 and the password 19 in the authentication information D4 and sends it to the relay server 3 (arrow F5).

As receiving the authentication request D10 from the image forming device 5, the relay server 3 identifies the user information D7 received from the information processing device 4 on the basis of the user name 18 in the authentication request D10. After identifying the user information D7, the relay server 3 decrypts the access information D9 in the user information D7 with the password 19 in the authentication request D10. The relay server 3 accesses the authentication server 2 with the decrypted access information D9 and sends a user verification request D11 to the authentication server 2 (arrow F6). The user verification request D11 sent to the authentication server 2 contains information with regard to the user name matching both of that in the authentication request D10 and the user information D7.

The relay server 3 receives a user verification result D12 from the authentication server 2 (arrow F7). In response to the receipt of the user verification result D12, the relay server 3 determines whether or not the user specified the print job D3 to the image forming device 5 is one of the registered users and sends a response D13 to the authentication request corresponding to the result of the determination to the image forming device 5 (arrow F8). For the registered user, information regarding the functions available for the registered user is included in the response D13.

The image forming device 5 receives the response D13 in response to the authentication request D10 sent to the relay server 3. As receiving the response D13 from the relay server 3, the image forming device 5 determines whether or not to execute the print job with the response D13 and executes a process corresponding to the determination result.

The relay server 3 may not identify the user information D7 corresponds to the authentication request D10 at receipt of the authentication request D10 from the image forming device 5. In such a case, the relay server 3 is put into a waiting state for receipt of the user information D7 from the information processing device 4 for a predetermined period of time. When receiving the user information D7 corresponds to the authentication request D10 in the predetermined period of time, the relay server 3 sends the user verification request D11 to the authentication server 2 and sends the response D13 on the basis of the user verification result D12 from the authentication server 2 to the image forming device 5, which is the same as the above-described process.

When not receiving the user information D7 corresponds to the authentication request D10 in the predetermined period of time, or failing to decrypt the access information D9, the relay server 3 sends the authentication request D10 received from the image forming device 5 as it is to the authentication server 2. The user name and the password received from the image forming device 5 are sent to the authentication server 2 as they are, and the normal user authentication process is performed in the authentication server 2. The relay server 3 sends the response D13 to the image forming device 5 according to the authentication result acquired from the authentication server 2.

In the present preferred embodiment, as the print instruction is given in the logged-in state in which the information processing device 4 is logged in by the user normally, the information processing device 4 attaches the authentication information D4 containing the user name 18 and the password 19 set in the printer driver 4b to the print job D3 and sends to the image forming device 5. The information processing device 4 and the image forming device 5 sends and receives to each other with the general communications protocol for transmission and receipt of the print job, so an interface for extra communications with an enhanced communications protocol is not necessary to be implemented.

The password not matching the password registered in the authentication database 2a in the authentication server 2 is sometimes contained in the authentication information D4 addressed to the image forming device 5 in the present preferred embodiment. If the password registered in the authentication database 2a in the authentication server 2 is updated on a regular basis, for example, the password set in the printer driver 4b does not match the password in the authentication server 2.

In order to avoid failing of execution of the print job in such a case, the information processing device 4 of the present preferred embodiment sends the user information D7 indicating that the user is successfully authenticated in the authentication server 2 to the relay server 3 with sending the print job D3 to the image forming device 5. After receiving the authentication request D10 from the image forming device 5, the relay server 3 identifies the user information D7 from the information processing device 4 and sends the user verification request D11 just to verify the registration of the user to the authentication server 2. The user verification request D11 does not contain the password that may not match the password managed in the authentication server 2, so the authentication of the user is not performed in the authentication server 2. The verification if the specified user is registered in the authentication database 2a is performed. If it is verified that the user name contained in the user information D7 is registered in the authentication server 2 as a result of the verification in the authentication server 2, the relay server 2 sends the response indicating that the user is one of the registered users to the image forming device 5. According to the present preferred embodiment, even when the password not matching the one registered in the authentication server 2 is contained in the authentication information D4 received with the print job D3 by the image forming device 5, the image forming device 5 receives the response D13 indicating that the user is the registered user from the relay server 3. The print job D3, therefore, is allowed to be executed normally by the image forming device 5. The conventional problems may be solved without making any improvements in the image forming device 5.

Figure 7:
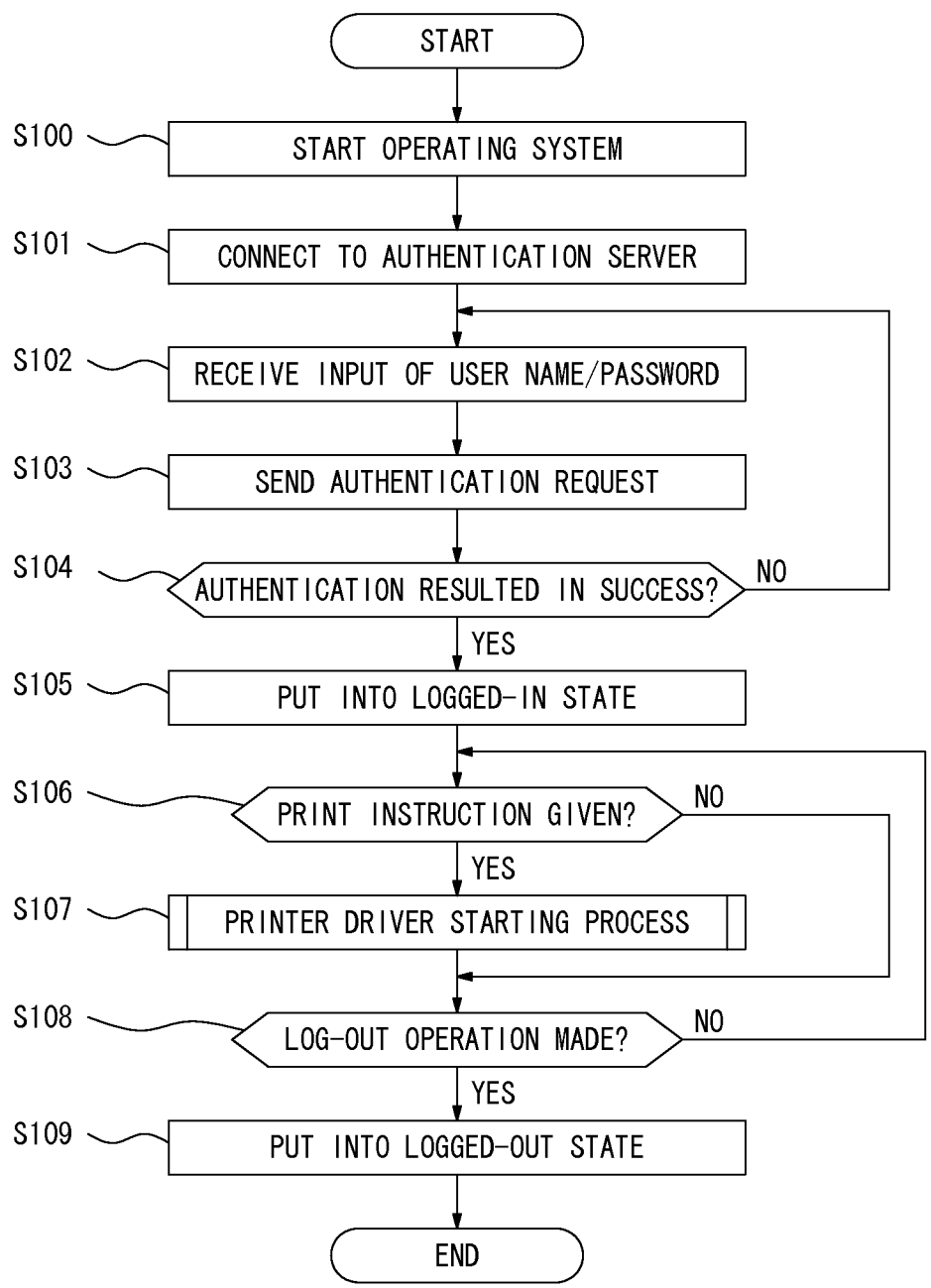
FIG. 7 is a flow diagram explaining an exemplary main procedure of a process performed in the information processing device.

Next, process in the information processing device 4 is explained. FIG. 7 is a flow diagram explaining an exemplary sequential procedure of a process performed in the information processing device 4. The process is performed in response to power supply to the information processing device 4. As the information processing device 4 is turned on, the operating system 4a is started (step S100). The information processing device 4 performs the process in accordance with the procedure defined in the operating system 4a. To be more specific, as starting the operating system 4a, the information processing device 4 connects to the authentication server 2 via the network 6 first (step S101) and receives an operation to input a user name and a password from the user (step S102). After the user name and the password are input by the user, the information processing device 4 sends the authentication request D1 containing the user name and the password to the authentication server 2 (step S103). The authentication of the user is performed in the authentication server 2 in response to the authentication request and the authentication result is sent to the information processing device 4.

The information processing device 4 determines whether or not the authentication of the user in the authentication server 2 results in success (step S104). When the authentication results in failure (when a result of step S104 is NO), the information processing device 4 returns to step S102 to receive the operation to input the user name and the password from the user again. When the authentication results in success (when a result of step S104 is YES), the information processing device 4 is put into a logged-in state in which the user is allowed to use (step S105).

The information processing device 4 determines whether or not the print instruction is given by the user (step S106). In response to the print instruction (when a result of step S106 is YES), the information processing device 4 performs a printer driver starting process (step S107). The information processing device 4 starts the printer driver 4b while the operating system 4a has been started and performs the process in accordance with the procedure defined in the printer driver 4b by the printer driver starting process (step S107). If the print instruction is not given (when a result of step S106 is NO), the printer driver starting process is not performed.

The information processing device 4 then determines whether or not a log-out operation is made by the user (step S108). If the log-out operation is not made (when a result of step S108 is NO), the process returns to step S106. If the log-out operation is made (when a result of step S108 is YES), the information processing device 4 is put into a logged-out state to complete the process (step S109).

Figure 8:
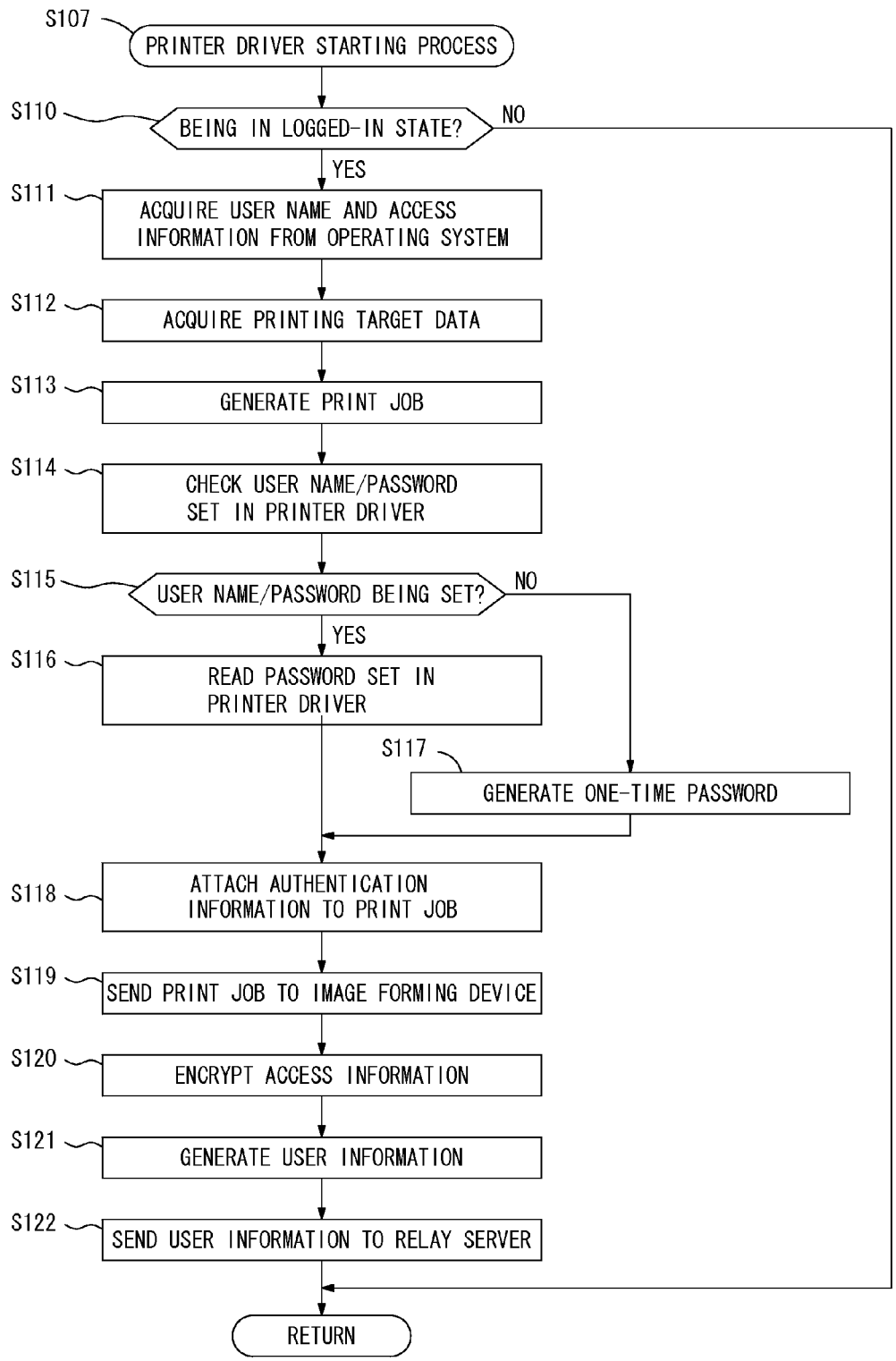
FIG. 8 is a flow diagram explaining an exemplary detailed procedure of a printer driver starting process in the information processing device.

FIG. 8 is a flow diagram explaining an exemplary detailed procedure of the printer driver starting process (step S107). After starting the printer driver 4b, the information processing device 4 firstly determines whether or not it is in the logged-in state (step S110). It is determined that the information processing device 4 is not in the logged-in state, and the process is complete. When it is determined that the information processing device 4 is in the logged-in state, the information processing device 4 acquires the user name of the logged-in user and the access information to access the authentication server 2 managed in the operating system 4a (step S111).

The information processing device 4 then acquires the printing target data specified by the user (step S112) and generates the print job D3 (step S113). The information processing device 4 checks the user name and the password set in the printer driver 4b in advance (step S114). When the user name and the password are set in the printer driver 4b (when a result of step S115 is YES), the information processing device 4 reads the password set in the printer driver 4b (step S116). In contrast, when no password is set in the printer driver 4b (when a result of step S115 is NO), the information processing device 4 generates the one-time password (step S117).

The information processing device 4 generates the authentication information D4 with the password read in step S116, or the one-time password generated in step S117 and attaches to the print job D3 (step S118). The information processing device 4 sends the print job D3 with the authentication information D4 to the image forming device 5 (step S119).

The information processing device 4 encrypts the access information with the password read in step S116, or the one-time password generated in step S117 as the encryption key (step S120). The information processing device 4 generates the user information D7 to send to the relay server 3 (step S121), and sends the generated user information D7 to the relay server 3 (step S122). Thus, the printer driver starting process is complete.

The information processing device 4 sends the user information D7 as to the logged-in user to the relay server 3 while sending the print job D3 with the authentication information D4 to the image forming device 5 through the above-described process. The access information D9 in the user information D7 is information encrypted with the password sent to the image forming device 5 as the encryption key.

Figure 9:
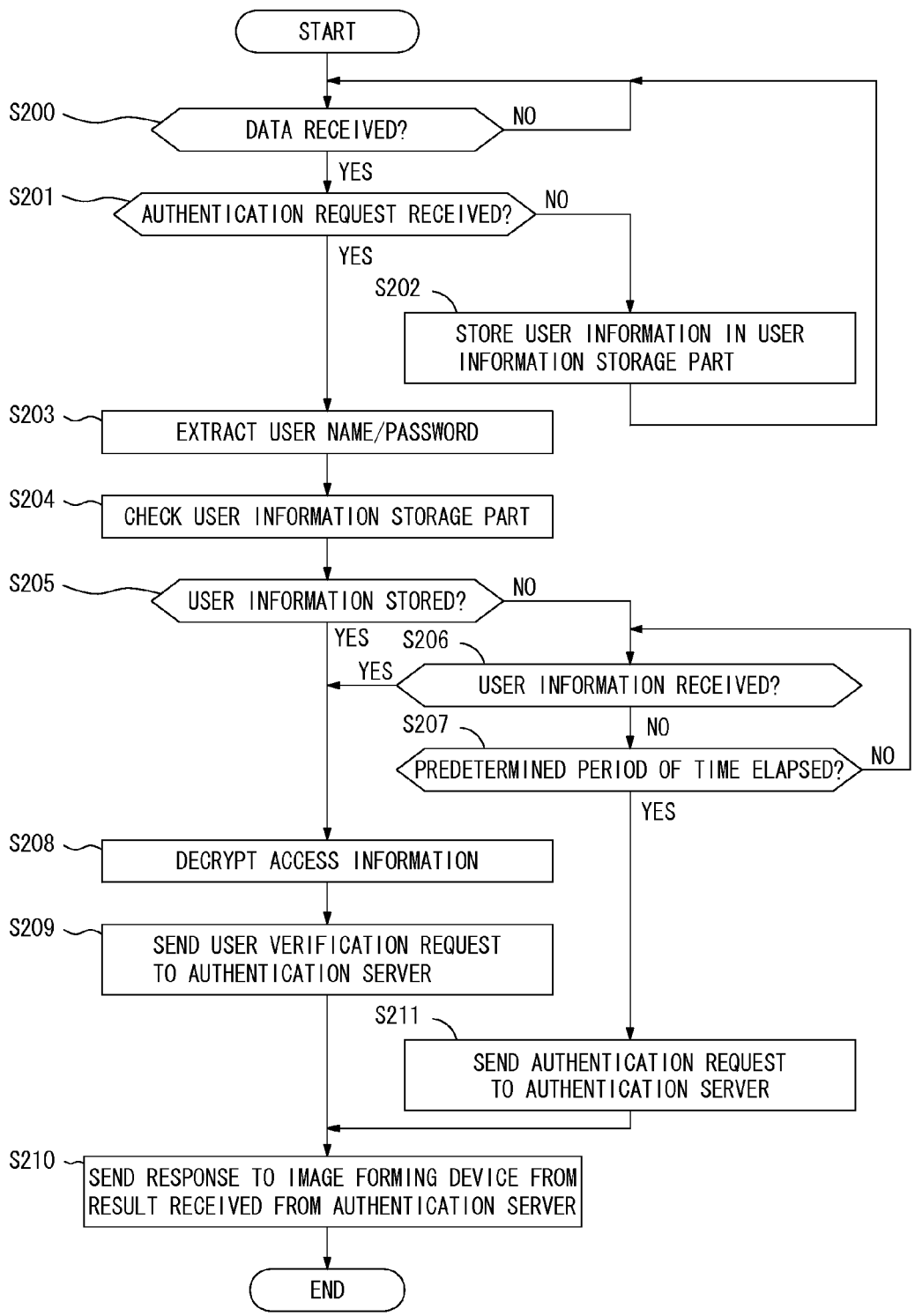
FIG. 9 is a flow diagram explaining an exemplary main procedure of a process performed in the relay server.

Next, process in the relay server 3 is explained. FIG. 9 is a flow diagram explaining an exemplary sequential procedure of a process performed in the relay server 3. The process is performed in response to power supply to the relay server 3 and execution of the above-mentioned relay server program 37. Upon start of this process, the relay server 3 determines whether or not the data is received via the network 6 (step S200). The relay server 3 is put into a waiting state until receiving the data if the data is not received. In response to receipt of the data via the network 6, the relay server 3 determines if the received data is the authentication request D10 from the image forming device 5 (step S201). For the data other than the authentication request D10 (when a result of step S201 is NO), the relay server 3 stores the user information D7 in the user information storage part 38 (step S202) since the received data should be the user information D7 from the information processing device 4. The relay server 3 returns to step S200.

If the data, the authentication request D10 is received (when a result of step S201 is YES), the relay server 3 extracts the user name and the password contained in the authentication request D10 (step S203). The relay server 3 checks if the user information storage part 38 (step S204) to see if it stores therein the user information D7 corresponds to the received authentication request D10 (step S205). When being allowed to identify the user information D7 corresponds to the received authentication request D10 (when a result of step S205 is YES), the relay server 3 decrypts the access information D9 encrypted with the password in the authentication request D10 as the key (step S208). The relay server 3 accesses the authentication server 2 with the decrypted access information D9 to send the user verification request D11 (step S209). With the result of the user verification received from the authentication server 2, the relay server 3 then sends the response D13 to the image forming device 5 (step S210).

When it is determined that the user information D7 corresponds to the received authentication request D10 is not stored by checking the user information storage part 38 (when a result of step S205 is NO), the relay server 3 is put into the waiting state to receive the user information D7 from the information processing device 4 for the predetermined period of time (step S206 and S207). As receiving the user information D7 corresponds to the authentication request D10 (when a result of step S206 is YES), the relay server 3 performs the process in step S208 and S209 to send the user verification request D11 to the authentication server 2. The predetermined period of time may elapse without having receipt of the user information D7 corresponds to the authentication request D10 (when a result of step S207 is YES). In such a case, the relay server 3 sends the authentication request D10 received from the image forming device 5 as it is to the authentication server 2 (step S211). The relay server 3 sends the response D13 to the image forming device 5 based on the authentication result of the user from the authentication server 2 (step S210).

With the above-described process, in response to the receipt of the authentication request D10 from the image forming device 5, the relay server 3 identifies the user information D7 received from the information processing device 4 and verifies whether or not the user is one of the registered users through data communication with the authentication server 2 based on the user information D7. The relay server 3 sends the response to the authentication request to the image forming device 5 from the verification result.

With the user authentication resulted in success through data communication with the authentication server 2, the information processing device 4 of the present preferred embodiment executes the printer driver 4b to send the print job D3 to the image forming device 5. In sending the print job D3, the information processing device 4 attaches the authentication information D4 set in advance in the printer driver 4b to the print job D3 to send to the image forming device 5. At the same time, the information processing device 4 sends the user information D7 indicating that the user is successfully authenticated in the authentication server 3 to the relay server 3. The relay server 3 receives the authentication request D10 sent from the image forming device 5 after the image forming device 5 receives the print job D3. In this case, the relay server 3 identifies the user information D7 received from the information processing device 4 from the authentication information in the received authentication request D10 and establishes data communication with the authentication server 2 based on the identified user information. The relay server 3 then determines if the user is the registered user through data communication and sends the response to the authentication request to the image forming device 5 from the determination result.

In the above-described configuration, the print job D3 is allowed to be sent and received with the general protocol for transmission and receipt of the print job between the information processing device 4 and the image forming device 5. It is, therefore, unnecessary to make any modification on the image forming device 5, so it makes relatively easy to introduce the configuration in existing information processing systems. When the image forming device 5 receives the print job D3, the functions on the information processing device 4 and the relay server 3 enable to verify whether or not the user gave the instruction on the print job D3 is the registered user and to allow the execution of the print job D3 only for the registered user. It allows successfully avoiding execution of the print job specified by unregistered users.

The information processing device 4 of the present preferred embodiment generates the authentication information D4 containing the user name for identifying the user and the password set in the printer driver 4b and attaches the generated authentication information D4 to the print job D3 to send to the image forming device 5. While sending the authentication information D4 to the image forming device 5, the information processing device 4 generates the user information D7 containing the user name and the access information to access the authentication server 2 and sends to the relay server 3. The relay server 3 identifies the user information D7 corresponds to the authentication request D10 from the user name in the authentication request D10 received from the image forming device 5 and the user name in the user information D7 received from the information processing device 4.

The above-described configuration enables the relay server 3 to have information regarding the correspondency between the authentication request D10 and the user information D7 with the user name as the identification information. The relay server 3 is thus allowed to properly identify the user information D7 corresponds to the authentication request D10. The user name is used as the information for identifying the user in the present preferred embodiment, to which the present invention is not intended to be limited. Information such as user ID may be used as the identification information.

The information processing device 4 of the present preferred embodiment encrypts the access information D9 with the password attached to the print job D3, thereby generating the user information D7. The relay server 3 decrypts the encrypted access information D9 with the password in the authentication request D10 from the image forming device 5 and establishes data communication with the authentication server 2.

In this configuration, at the time that the user information D7 moves through the network 6, the access information D9 is encrypted. It, therefore, successfully avoids the relationship between the user name and the authentication server 2 in which the user name is registered leaking out to other parties. The security on data communication between the information processing device 4 and the relay server 3, therefore, are also allowed to be ensured.

There may be the user with no password set in the printer driver 4b as described above. In such a case, the information processing device 4 of the present preferred embodiment generates the random password and contains in the authentication information D4. The information processing device 4 encrypts the access information D9 with the generated random password. Thus, even when the password is not set in the printer driver 4b for the user, the security on data communication between the information processing device 4 and the relay server 3 may be ensured.

When not receiving the user information D7 corresponds to the authentication request D10 received from the image forming device 5 from the information processing device 4, the relay server 3 of the present preferred embodiment is put into the waiting state to receive of the user information D7 corresponds to the authentication request D10 for the predetermined period of time. After the predetermined period of time elapses without receiving the user information D7 corresponds to the authentication request D10, the relay server 3 sends the authentication request D10 received from the image forming device 5 to the authentication server 2 and sends the response to the image forming device 5 from the authentication result of the user in the authentication server 2. In the configuration, it does not cause any problem even when the delivery of the user information D7 from the information processing device 4 is delayed because of a load on the network 6, for example. Some information processing systems 1 include old-style information processing devices not configured to send the user information D7 to the relay server 3. On such information processing system 1, the relay server 3 is configured to perform process just like the conventional process when the print job is output from the old-style information processing device. More specifically, the relay server 3 receives the print job output from the old-style information processing device not configured to send the user information D7 to the relay server 3. The execution of such print job in the image forming device 5 is allowed only when the user name and the password set in advance in the printer driver match those registered in the authentication server 2.

The relay server 3 receives the authentication request D10 from the image forming device 5 and identifies the user information D7 from the received authentication request D10. As successfully identifying the user information D7, the relay server 3 of the present preferred embodiment sends the user verification request D11 to the authentication server 2 based on the user information D7. In response to the receipt of the user verification result D12 from the authentication server 2, the relay server 3 determines whether or not the user gave the instruction on the print job D3 is one of the registered users from the user verification result D12.

In some cases, however, the authentication server 2 is down or failure in the network 6 is caused at the time that the relay server 3 sends the user verification request D11 to the authentication server 2. The relay server 3 may not receive the user verification result D12 from the authentication server 2 in such situations. When the relay server 3 successfully identifies the user information D7 received from the information processing device 4 from the authentication information contained in the authentication request D10 from the image forming device 5, it may be configured to send the response indicating that the user is the registered user to the image forming device 5 even without the data communication with the authentication server 2. Thus, the print job may be executed by the image forming device 5 even in the cases such that the authentication server 2 is down or failure in the network 6 is caused, which enables increase of the level of convenience in the information processing system 1.

The above-described configuration may cause the lower level of the security. In order to maintain the security level, the relay server 3 preferably stores therein the previous responses sent to the image forming device 5. The relay server 3 then sends the response indicating that the user is the registered user to the image forming device 5 only when the previous responses indicate the positive results when the data communication with the authentication server 2 is not available. The above-described configuration avoids the lower level of the security even in the cases such that the authentication server 2 is down or failure in the network 6 is caused and allows the image forming device 5 to execute the print job.

While the preferred embodiment of the present invention has been described above, the present invention is not intended to be confined to the details shown above.

What is claimed is:

1. An information processing system, including:
    an information processing device generating a print job by executing a printer driver;
    an image forming device producing a printed output in response to the print job received from said information processing device;
    an authentication server performing authentication of a user who uses said information processing device and said image forming device; and
    a relay server receiving an authentication request from said image forming device and establishing data communication with said authentication server, thereby sending a response to the authentication request to said image forming device, wherein
    said information processing device, in sending the print job to said image forming device by executing said printer driver after the user authentication results in success through data communication with said authentication server, attaches authentication information set in advance in said printer driver to the print job and sends to said image forming device, while sending user information indicating that the user is successfully authenticated in said authentication server to said relay server, and
    said relay server, in response to receipt of the authentication request sent from said image forming device which receives the print job, identifies the user information received from said information processing device based on said authentication information included in the received authentication request and establishes data communication with said authentication server based on the identified user information, thereby verifying if the user is a registered user and sending the response to the authentication request to said image forming device in accordance with the verification result.

2. The information processing system according to claim 1, wherein
    said information processing device generates said authentication information containing identification information for identifying the user and a password set in said printer driver to attach to the print job and sends the print job with said authentication information to said image forming device, while generating the user information containing the identification information and access information for accessing said authentication server and sending to said relay server, and
    said relay server identifies the user information corresponds to the authentication request based on the identification information in the authentication request received from said image forming device and the identification information in the user information received from said information processing device.

3. The information processing system according to claim 2, wherein
    said information processing device encrypts said access information with said password, thereby generating the user information, and said relay server decrypts said encrypted access information with a password included in the authentication request received from said image forming device and establishes data communication with said authentication server.

4. The information processing system according to claim 3, wherein
said information processing device generates a random password to contain in the authentication information when no password is set in said printer driver, and encrypts said access information with the generated random password.

5. The information processing system according to claim 1, wherein
said relay server sends the response indicating that the user is the registered user to said image forming device even the data communication with said authentication server is not available when the user information received from said information processing device is successfully identified from said authentication information included in the received authentication request from said image forming device.

6. The information processing system according to claim 1, wherein
said relay server is put into a waiting state for a predetermined period of time when the user information corresponds to the authentication request from said image forming device is not received from said information processing device, and sends the authentication request received from said image forming device to said authentication server in case such that the user information corresponds to the authentication request is not received in the predetermined period of time, thereby sending the response to said image forming device based on an authentication result of the user in said authentication server.

7. An information processing device, comprising:
a log-in controlling part for putting into a logged-in state based on an authentication result of a user performed in an authentication server;
a job generation part for generating a print job by executing a printer driver after being put into the logged-in state by said log-in controlling part;
a job transmission part for reading authentication information set in advance in said printer driver to attach to the print job and sending the print job with said authentication information to an image forming device; and
a user information transmission part for sending user information indicating that the user is successfully authenticated through authentication in said authentication server to a relay server that is a destination of an authentication request generated based on said authentication information and sent by said image forming device.

8. The information processing device according to claim 7, wherein
said job transmission part generates the authentication information containing identification information for identifying the user and a password set in said printer driver to attach to the print job and sends the print job with the authentication information to said image forming device, and
said user information transmission part generates the user information containing the identification information and access information for accessing said authentication server and sends to said relay server.

9. The information processing device according to claim 8, wherein
said user information transmission part encrypts said access information with said password, thereby generating the user information.

10. The information processing device according to claim 9, wherein
said user information transmission part generates a random password to contain in the authentication information when no password is set in said printer driver, and encrypts said access information with the generated random password.

11. A relay server receiving an authentication request from an image forming device that executes a print job and establishing data communication with an authentication server in response to the authentication request, thereby sending a response to the authentication request to said image forming device, comprising:
a user information acquisition part for receiving user information indicating that a user is successfully authenticated in said authentication server from an information processing device that sends the print job to said image forming device;
a user information identification part for identifying the user information received from said information processing device based on authentication information contained in the authentication request in response to receiving the authentication request from said image forming device; and
a response processing part for verifying whether or not the user is a registered user through data communication with said authentication server established on a basis of the user information identified by said user information identification part and sending the response to the authentication request to said image forming device in accordance with the verification result, wherein
said user information identification part is put into a waiting state for a predetermined period of time when the user information corresponds to the authentication request from said image forming device is not received from said information processing device, and
said response processing part sends the authentication request received from said image forming device to said authentication server in case such that the user information corresponds to the authentication request is not received in the predetermined period of time, thereby sending the response to said image forming device based on an authentication result of the user in said authentication server.

12. The relay server according to claim 11, wherein said response processing part sends the response indicating that the user is the registered user to said image forming device even when data communication with said authentication server is not available when the user information received from said information processing device is successfully identified from said authentication information included in the received authentication request from said image forming device.

13. The relay server according to claim 11, wherein
a response processing part decrypts access information included in the user information identified by said user information identification part with a password included in the authentication request received from said image forming device and establishes data communication with said authentication server in accordance with the decrypted access information.

14. A non-transitory computer-readable recording medium storing thereon a computer program executed in an image processing device, the computer program causing a computer provided in the image processing device to execute procedures comprising:

putting into a logged-in state based on an authentication result of a user performed in an authentication server;

generating a print job by executing a printer driver after being put into the logged-in state by said log-in controlling part;

reading authentication information set in advance in said printer driver to attach to the print job and sending the print job with said authentication information to an image forming device; and sending user information indicating that the user is successfully authenticated through authentication in said authentication server to a relay server that is a destination of an authentication request generated based on said authentication information and sent by said image forming device.

15. The non-transitory computer-readable recording medium according to claim 14, wherein the procedures further comprise:

generating the authentication information containing identification information for identifying the user and a password set in said printer driver to attach to the print job and sending the print job with the authentication information to said image forming device, and generating the user information containing the identification information and access information for accessing said authentication server and sending to said relay server.

16. The non-transitory computer-readable recording medium according to claim 15, wherein the procedures further comprise:

encrypting said access information with said password, thereby generating the user information.

17. The non-transitory computer-readable recording medium according to claim 16, wherein the procedures further comprise:

generating a random password to contain in the authentication information when no password is set in said printer driver, and encrypting said access information with the generated random password.

18. A non-transitory computer-readable recording medium storing thereon a computer program executed in a relay server, the relay server receiving an authentication request from an image forming device that executes a print job and establishing data communication with an authentication server in response to the authentication request, thereby sending a response to the authentication request to said image forming device, the computer program causing a computer provided in the relay sever to execute procedures comprising:

receiving user information indicating that a user is successfully authenticated in said authentication server from an information processing device that sends the print job to said image forming device;

identifying the user information received from said information processing device based on authentication information contained in the authentication request in response to receiving the authentication request from said image forming device;

verifying whether or not the user is a registered user through data communication with said authentication server established on a basis of the user information identified and sending the response to the authentication request to said image forming device in accordance with the verification result;

putting into a waiting state the identification of the user information for a predetermined period of time when the user information corresponding to the authentication request from said image forming device is not received from said information processing device, and sending the authentication request received from said image forming device to said authentication server in case such that the user information corresponding to the authentication request is not received in the predetermined period of time, thereby sending the response to said image forming device based on an authentication result of the user in said authentication server.

* * * * *